Sept. 1, 1936. R. NEUHAUS Re. 20,093

LUBRICATED PLUG VALVE

Original Filed May 5, 1934

Ralph Neuhaus INVENTOR.

BY Jesse R. Stone

ATTORNEYS.

Reissued Sept. 1, 1936 Re. 20,093

UNITED STATES PATENT OFFICE 20,093

LUBRICATED PLUG VALVE

Ralph Neuhaus, Houston, Tex., assignor to Hughes Tool Company, Houston, Tex., a corporation of Texas Original No. 2,011,113, dated August 13, 1935, Serial No. 724,061, May 5, 1934. Application for reissue July 13, 1936, Serial No. 90,392

4 Claims. (Cl. 251—93)

My invention relates to plug valves in which a lubricant is employed to assist in maintaining a seal and also to facilitate the operation of the valve.

It is an object of the invention to assure lubrication on the downstream side of the plug where the plug fits most closely in the housing of the valve so that a seal may be preserved along that surface. I find that where lubricant is fed to the valve housing about the valve without special provision to force it into the close fitting side of the plug, that the lubricant escapes into the loose fitting side of the plug and is not effective in sealing the plug at the point where it is most desired.

I also desire to employ a spring or the like between the valve stem and the valve to hold the valve registered and thus enable the valve to be constructed without machining the valve to close tolerances. Economy of construction is thus accomplished.

In the drawing herewith Fig. 1 is a central longitudinal section through a plug valve employing my invention.

Figure 2:
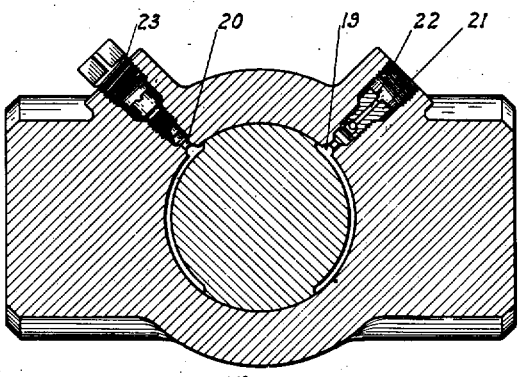
Fig. 2 is a transverse section of the plane 2—2 of Fig. 1.

The invention is shown as applied to a stop cock having a cylindrical plug 1 therein, but is obviously applicable to other shapes of plug valves. Said plug fits freely within a valve body 2 and transversely of a fluid passage 3 in said body. Said valve body forms a housing for the valve which is enclosed in a chamber 4, cylindrical in shape.

The lower end of said valve chamber is recessed at 5 and the wall 6 has a screw 7 secured therein; the head of said screw within the chamber forming a stop post 8, which projects into an arcuate groove or recess 9 in the lower end of the plug. Said post limits the downward movement of the plug and also limits the rotation of said plug to about 90 degrees.

The upper end of the valve chamber 4 is closed by a threaded sleeve 10, through which the valve stem 11 is rotatable. There is a stuffing box 12 about the stem within the outer end of sleeve 10 to preserve a seal about the stem.

Figure 3:
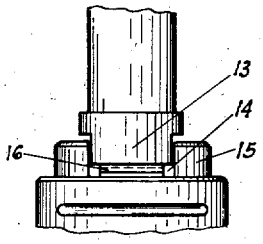
Fig. 3 is a broken detail showing the connection between the valve stem and the valve.
Figure 1:
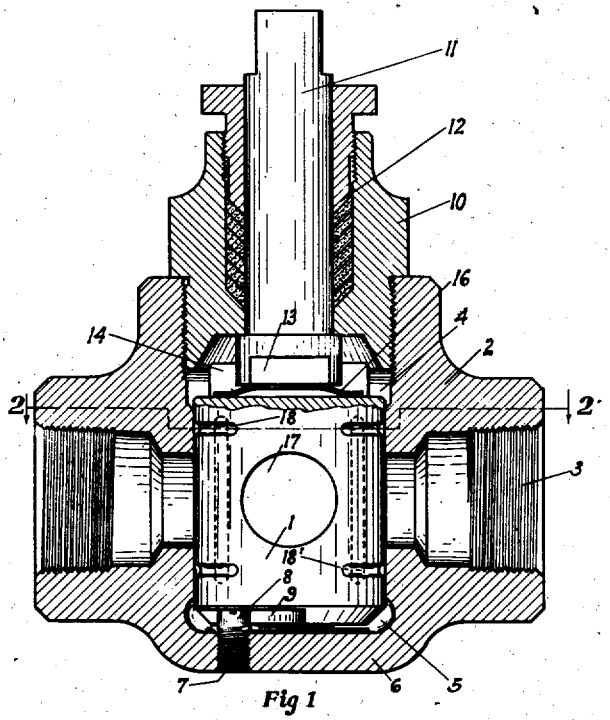
Figure 4:
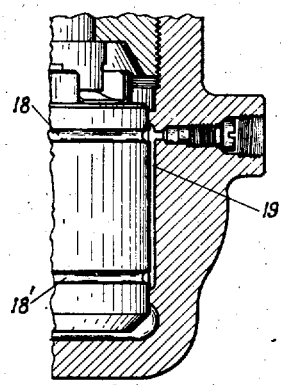
Fig. 4 is a broken vertical section showing a lubricant opening.

The connection between the valve stem 11 and the valve plug 1 is a loose one formed by a flattened head 13 fitting between two upstanding lugs 15 on the plug, as seen in Fig. 3. In order to avoid the necessity for accurate machining, I place a spring 16 between the lower end of the stem 11 and the valve plug between the lugs 15. This spring acts to hold the plug valve 1 downwardly against the stop post 8 so that the opening 17 in the plug may register with the fluid passage 3 when said valve is in open position. By the use of this spring it becomes unnecessary to machine the parts accurately where the valve stem fits the slot 14 but fairly large tolerances can be made.

The plug has lubricant conducting grooves 18 and 18' adjacent its upper and lower ends respectively. These grooves are on opposite sides of the plug and extend around the plug about 90° of its circumference and on the sides away from the passage 17.

The body or housing 2 is formed with vertical channels 19 on the inner wall of the chamber 4, one to connect each of the sets of grooves 18, 18' in the plug. As will be understood from Fig. 2 these channels 19 are preferably formed on one side of the housing and connect with openings 20 in the wall of the valve body, through which lubricant may be forced into said channels.

Said openings 20 are threaded to receive valve plugs 21 which have lubricant passage 22 axially thereof. The passages have check valves therein allowing flow of lubricant inwardly only. The outer ends of openings 20 are threaded to receive a grease gun and are normally closed by plug 23.

These lubricant conducting channels, arranged as disclosed, make it possible to supply lubricant on either the upstream or downstream side of the valve. This type of valve is frequently used to control fluids under high pressure and, in such cases, I find that the body of the valve plug is forced by the pressure tightly against the downstream side of the valve chamber. Lubricant will then tend to be fed only to the loose or upstream side of the plug where it is least needed. By cutting the lubricant grooves on each side of the valve off from the grooves on the other side and then feeding lubricant positively to each side separately, I am able to assure lubricant on the downstream side and thus assure a seal and also keep the valve plug from sticking in its seat. Thus a common difficulty in plug valves is overcome.

The valve herein disclosed is cheap to manufacture but is also effective in use and durable in its lasting qualities.

What I claim as new:

1. A plug valve including a body having a longitudinal fluid passage, a valve chamber transversely of said passage, a valve plug adapted to fit within said chamber and having an opening adapted to be brought, by rotation, into or out of registration with said passage, means interfitting loosely with one end of said plug, to rotate the same, opposite lubricant channels formed in said plug adjacent the upper and lower ends of said plug, to conduct lubricant to the upstream side of said plug and separate channels similarly formed to conduct lubricant to the downstream side thereof when said plug is in closed position, said channels on opposed sides being unconnected with each other or with the ends of said plug.

2. A plug valve including a body having a longitudinal fluid passage, a valve chamber transversely of said passage, a valve plug adapted to fit within said chamber and having an opening adapted to be brought, by rotation, into or out of registration with said passage, means to rotate the same, lubricant channels to conduct lubricant to the upstream side of said plug and separate channels to conduct lubricant to the downstream side thereof when said plug is in closed position, said channels being unconnected with each other or with the ends of said plug.

3. In a plug valve a valve chamber, a plug valve therein having a fluid opening diametrically thereof, arcuate channels in said plug on opposite sides of said plug away from said opening at both the upper and lower ends thereof, means to connect the upper and lower channels on each side with each other, the channels on opposite sides being separately formed to provide closed passages from which lubricant cannot flow, means to rotate said plug and means to feed lubricant to the channels on each side of said plug separately from the other.

4. A valve body having a fluid passage, a valve plug transversely thereof and having a fluid opening, a groove at one end of said plug, a valve stem, a head on said stem engaging in said groove, a post in said valve body engaging the end of said plug opposite said stem, and means between said stem and said valve plug in said groove to hold said plug resiliently toward said post.

RALPH NEUHAUS.